(12) United States Patent
Mano

(10) Patent No.: US 6,356,295 B1
(45) Date of Patent: Mar. 12, 2002

(54) IMAGE TRANSMISSION SYSTEM

(75) Inventor: Shigeyuki Mano, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/357,848

(22) Filed: Jul. 21, 1999

Related U.S. Application Data

(62) Division of application No. 08/798,798, filed on Feb. 12, 1997, now abandoned.

(30) Foreign Application Priority Data

| | | | |
|---|---|---|---|
| Feb. 29, 1996 | (JP) | ............................................. | 8-042550 |
| Feb. 29, 1996 | (JP) | ............................................. | 8-042551 |
| Feb. 29, 1996 | (JP) | ............................................. | 8-042552 |

(51) Int. Cl.[7] ................................................ H04N 7/14
(52) U.S. Cl. ................................ 348/14.09; 348/14.08; 348/14.07
(58) Field of Search .......................... 348/14.01, 14.02, 348/14.03, 14.04, 14.05, 14.06, 14.07, 14.08, 14.09, 14.1, 14.11, 14.12, 14.13; 370/486, 487

(56) References Cited

U.S. PATENT DOCUMENTS

| | | | | |
|---|---|---|---|---|
| 5,111,306 A | * | 5/1992 | Kanno et al. | .................. 348/74 |
| 5,412,478 A | * | 5/1995 | Ishihara et al. | ............... 348/72 |
| 5,568,271 A | * | 10/1996 | Fukuchi et al. | ............... 348/74 |
| 5,583,566 A | * | 12/1996 | Kanno et al. | .................. 348/72 |
| 5,614,943 A | * | 3/1997 | Nakamura et al. | ............ 348/72 |

FOREIGN PATENT DOCUMENTS

JP          407212733 A   *   8/1995   ............ H04N/7/15

* cited by examiner

*Primary Examiner*—Huyen Le
*Assistant Examiner*—Melur Ramakrishnaiah
(74) *Attorney, Agent, or Firm*—Miles & Stockbridge P.C.

(57) ABSTRACT

An image transmission system includes a plurality of image transmission devices which are connected by a network. Each of the image transmission devices comprises a frame memory for storing input image data from another image transmission device, a display device for displaying an image on the basis of the data stored in the frame memory, and a storage device different from the frame memory. The image transmission device also stores the image data in the storage device when storing the image data in the frame memory.

3 Claims, 9 Drawing Sheets

FIG.8

PLACE A

| CASSETTE | FILE NAME | | | | |
|---|---|---|---|---|---|
| DA | A01 | A02 | A03 | A04 | A05 |
| DB | B01 | B02 | B03 | B04 | B05 |
| DC | C01 | C02 | C03 | C04 | C05 |
| DE | E01 | E02 | E03 | E04 | E05 |
| DF | F01 | F02 | F03 | F04 | F05 |

FIG.9

PLACE B

| CASSETTE | FILE NAME | | | | |
|---|---|---|---|---|---|
| DB | B01 | B02 | B03 | B04 | B05 |
| DA | A01 | A02 | A03 | A04 | A05 |
| DE | E01 | E02 | E03 | E04 | E05 |
| DF | F01 | F02 | F03 | F04 | F05 |
| DC | C01 | C02 | C03 | C04 | C05 |

IMAGE TRANSMISSION SYSTEM

This application is a division of 08/798798, filed Feb. 12, 1997 now abandoned.

The entire disclosure of Japanese Patent Application Nos. 8-42550, 8-42551 and 8-42552 including specifications, claims, drawings and summaries is incorporated herein by reference in their entirety.

BACKGROUND OF THE INVENTION

1. Field of the Invention

The present invention relates to an image transmission device for transmitting input image data to another place, an image display device for displaying image data, and an image transmission. system combining these devices.

2. Related Background Art

Some conventional systems realize electronic conferencing between remote places by transmitting images and voices to a remote place and displaying and reproducing them in the remote place. In these conventional systems, a television signal of NTSC is often used as an image signal to be transmitted.

The resolution of an image transmittable by this television signal of NTSC is not high. Therefore, even when images of slides (e.g., photographs of microscopic images) used in research meetings or meetings of academic societies in the fields of medical, chemistry, and the like are transmitted, the transmitted images do not have a satisfactory image quality legible on the receiving side. These particular applications require transmission of high-definition (or high-resolution) images. Therefore, an image transmission system by which high-definition images can be exchanged in a conference held between a plurality of remote places is necessary.

An image transmission system comprises a plurality of image transmission devices. Transmitted image data is stored in an internal frame memory of an image transmission device and displayed. The data stored in the frame memory is easily destroyed by, e.g., an erroneous operation or transmission of another image. If it is necessary to transmit the image data again, the transmission consumes time and the network is used by the retransmission. In particular, transmitting a high-definition image is a big problem because the transmission time is long.

In either case, it takes a long time to transmit high-definition images because the images have a large image data amount.

Consequently, the transmitted images cannot be displayed in real time in a remote place and this makes a conference difficult to hold.

SUMMARY OF THE INVENTION

The present invention has been made in consideration of the above situation and has as its first object to provide an image transmission system capable of immediately reviving a transmitted image even if the image is erased.

To achieve the above object, the present invention provides an image transmission system in which a plurality of image transmission devices are connected by a network, each of the image transmission devices comprising a frame memory for storing input image data from another image transmission device, and a display device for displaying an image on the basis of the data stored in the frame memory, wherein the image transmission device also stores the image data in a storage device different from the frame memory when storing the image data in the frame memory.

The present invention also provides an image transmission system in which a plurality of image transmission devices are connected by a network, each of the image transmission devices comprising a frame memory for storing input image data from another image transmission device, a display device for displaying an image on the basis of the data stored in the frame memory, and a storage device different from the frame memory, wherein the image transmission device also stores the image data in the storage device when storing the image data in the frame memory, and further comprises means for transferring the image data stored in the storage device to the frame memory if the image data stored in the frame memory is lost.

The present invention also provides an image transmission system in which a plurality of image transmission devices are connected by a network, each of the image transmission devices comprising a frame memory for storing input image data from another image transmission device, a display device for displaying an image on the basis of the data stored in the frame memory, and a storage device different from the frame memory and capable of storing a plurality of image data, wherein the image transmission device also stores the image data in the storage device with a name assigned to the image data when storing the image data in the frame memory, and further comprises means for reading out the image data stored in the storage device by designating the name and transferring the image data to the frame memory if the image data stored in the frame memory is lost.

It is the second object of the present invention to provide an image transmission system capable of preventing the transmission time from being prolonged even when transmitting a high-definition image.

To achieve the above object, in an image transmission system in which a plurality of image transmission devices capable of transmitting and receiving image data are connected by a network, the present invention provides the improvement characterized in that the system comprises an exclusive control device which, before a certain image transmission device transmits image data to another image transmission device, prohibits other image transmission device(s) from transmitting a command or image data onto the network. This system may be so constructed that when the transmission of image data from a certain image transmission device to another image transmission device is completed, the exclusive control device can release the prohibition of transmission of a command or image data from other image transmission device(s) to the network.

In an image transmission system in which a plurality of image transmission devices capable of transmitting and receiving image data are connected by a network, the present invention also-provides the improvement characterized in that each of the image transmission devices sends an exclusion command for prohibiting other image transmission device(s) from transmitting a command or image data onto the network before transmitting image data to another image transmission device.

The present invention also provides an image transmission system comprising
- a plurality of image transmission devices capable of transmitting and receiving image data, and
- a control unit connected to the image transmission devices to control data transmission between the image transmission devices, the control unit including exclusive control means which, while a certain image transmission device is transmitting image data to another image transmission device, ignores a command or image-data received from other image transmission device(s). The exclusive control means may be so constructed that when the transmission of image data from a certain image transmission device to another image transmission device is completed, the exclusive control means can stop ignoring a command or image data from other image transmission devices.

The present invention also provides an image transmission system comprising a plurality of image transmission devices capable of transmitting and receiving image data, and a control unit connected to the image transmission devices to control data transmission between the image transmission devices, the control unit including exclusive control means which, while a certain image transmission device is transmitting image data to another image transmission device, stores a command or image data received from other image transmission devices and temporarily stops execution of the command or retransmission of the image data.

The exclusive control means may be so constructed that when the transmission of image data from a certain image transmission device to another image transmission device is completed, the exclusive control means can stop storing a command or image data received from other image transmission device(s) and transmit the stored command or image data.

The exclusive control means may also be so constructed that when the transmission of image data from a certain image transmission device to another image transmission device is completed, the exclusive control means can execute the stored command or transmit the stored image data.

It is the third object of the present invention to provide an image transmission device, an image display device, and an image transmission system which can be used in a conference held between a plurality of remote places by using high-definition images.

To achieve the above object, the present invention provides an image transmission device comprising image input means for inputting image data, image transfer means for transferring a plurality of input image data from the image input means, and indicating means for transferring an indication signal for indicating at least one of the plurality of image data after the image data are transferred from the image transferring means, the indication signal comprising a signal for indicating one image data by using at least two types of names.

The present invention also provides an image transmission device comprising an input unit for inputting a plurality of externally input image data, storage means for storing the input image data from the input unit, and display means for receiving an indication signal indicating at least one of the plurality of image data, reading out the image data indicated by the indication signal, and displaying an image of the readout image data, wherein the indication signal is a signal for indicating one image data by using at least two types of names.

The present invention also provides an image transmission system comprising an image transmission device including image input means for inputting image data, image transfer means for transferring a plurality of input image data from the image input means, and indicating means for transferring an indication signal for indicating at least one of the plurality of image data after the image data are transferred from the image transferring means, and an image display device including an input unit for inputting the plurality of image data transferred from the image transfer means, storage means for storing the input image data from the input unit, and display means for receiving the indication signal, reading out the image data indicated by the indication signal, and displaying an image of the readout image data, the indication signal comprising a signal for indicating one image data by using at least two types of names. The two types of names may be transferred at once when the indication signal is transferred. The two types of names may also be separately transferred when the indication signal is transferred.

The present invention also provides an image transmission device comprising image input means for inputting a plurality of image data having different resolutions, image transfer means for transferring, from among the input image data, image data with a low resolution to an external device and then transferring image data with a high resolution to the external device, and indicating means for outputting to the external device an indication signal for displaying the image data with a high resolution after the image data with a high resolution is transferred, the indication signal comprising a signal for indicating one image data by using at least two types of names.

BRIEF DESCRIPTION OF THE DRAWINGS

FIG. 8 is a view showing two types of names added to image data in an image transmission system according to the fifth embodiment of the present invention; and FIG. 9 is a view showing two types of names added to image data in an image transmission system according to the embodiment of the present invention.

DETAILED DESCRIPTION OF THE PREFERRED EMBODIMENTS

Embodiments of the present invention will be described below with reference to the accompanying drawings.

Figure 2:
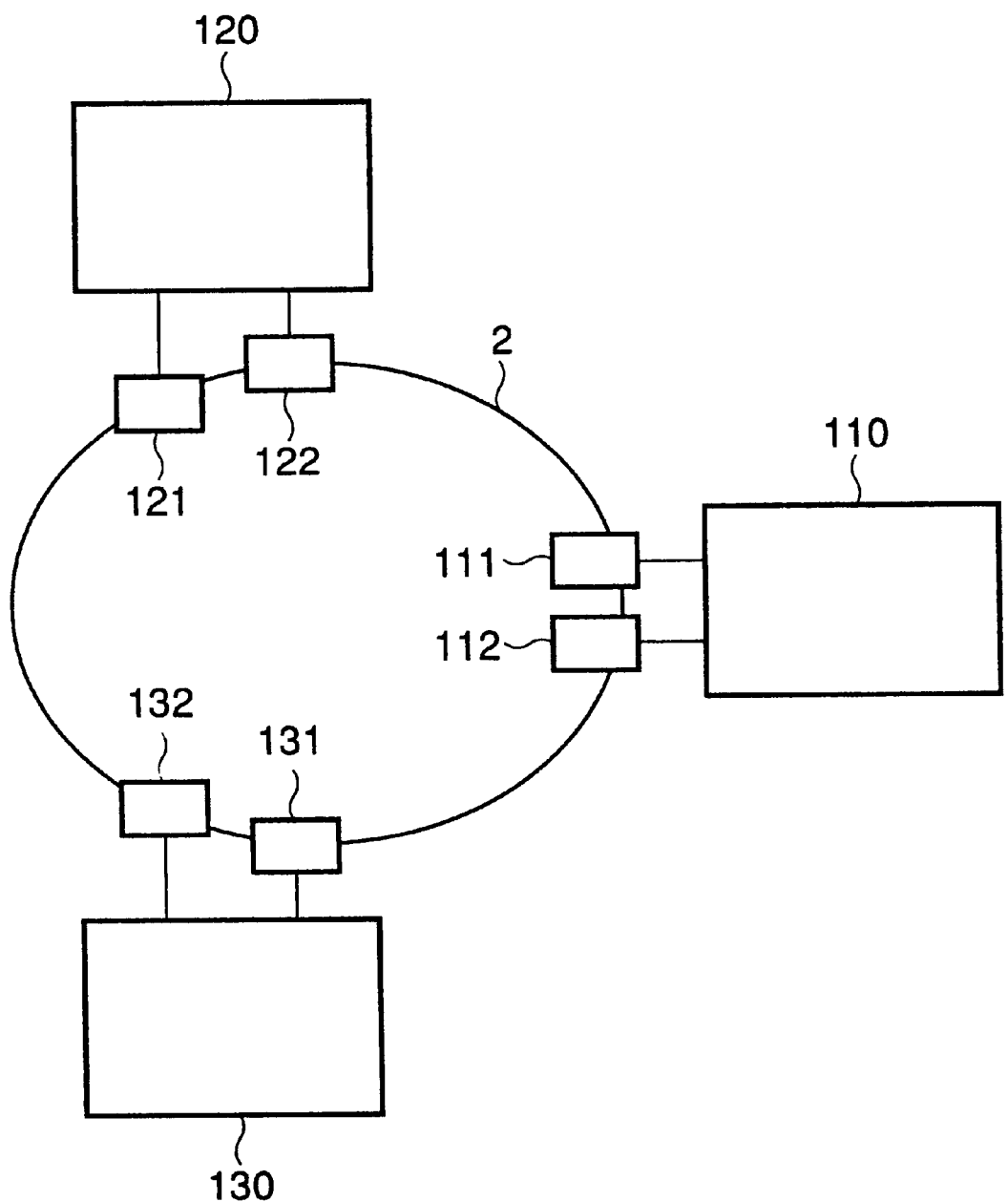
FIG. 2 is a view showing the arrangement of an image transmission system according to the first embodiment of the present invention.

FIG. 2 is a view showing the arrangement of an image transmission system as the first embodiment of the present invention. Referring to FIG. 2, transmission control units 111, 112, 121, 122, 131, and 132 are connected to a network line 2. These transmission control units are connected to image transmission devices 110, 120, and 130.

In this system, three image transmission devices are connected via the network. However, any number of devices can be connected as long as the number is two or more. These image transmission devices are installed in different places (remote places).

Figure 1:
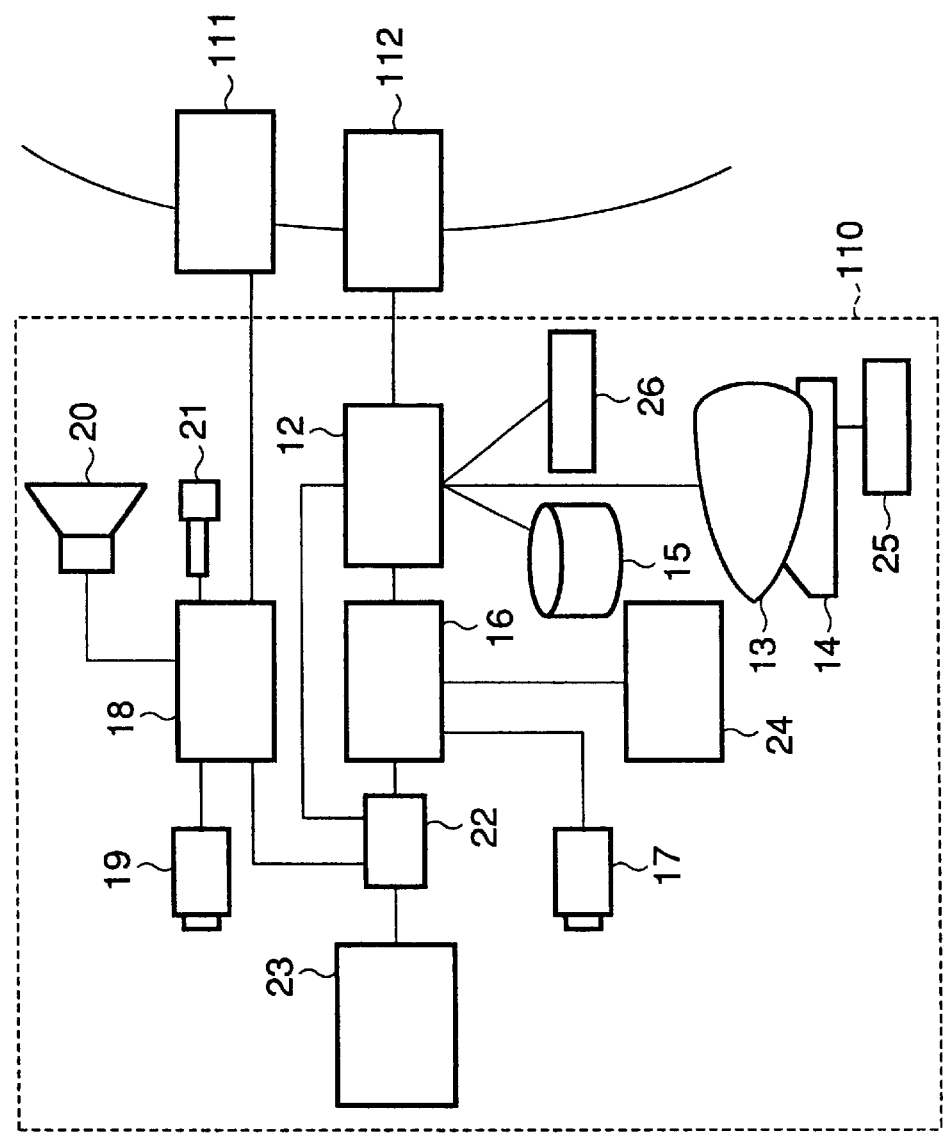
FIG. 1 is a view showing the arrangement of an image transmission device according to the first embodiment of the present invention.

FIG. 1 is a view showing the arrangement of the image transmission device 110. The other image transmission devices 120 and 130 have the same arrangement as this one.

Referring to FIG. 1, a CPU (Central Processing Unit) 12 is connected to the transmission control unit E 112. The CPU 12 receives Highvision digital image data transmitted from another image transmission device via the transmission control unit 112 and transmits Highvision digital image data to another image transmission device via the transmission control unit 112. The CPU 12 is connected to a display device 13, a keyboard 14, and a storage device 15. The storage device 15 is a device such as a hard disk device or an optical disk device using a large-capacity storage medium and stores Highvision digital image data. An operator performs operations by using the keyboard 14 while monitoring the contents displayed on the display device 13. As input devices, a pointing device such as a mouse 25 is used in addition to the keyboard 14. A tablet 26 can also be used.

An HDTV camera 17 picks up a Highvision image (an image of HDTV). The output Highvision image signal (analog image signal) from the HDTV camera 17 is applied to an HDTV I/O device 16. The HDTV I/O device 16 converts the input analog signal into digital image data and outputs the data to the CPU 12. Also, the HDTV I/O device 16 converts input digital image data from the CPU 12 into an analog image signal and outputs the signal to a switching device 22. The input digital image data to the HDTV I/O device 16 is once stored in a frame memory 24. The HDTV I/O device 16 reads out the digital image data from the frame memory 24, converts the data into an analog image signal, and outputs the signal.

An NTSC I/O device 18 is connected to the transmission control unit 111. The NTSC I/O device 18 receives digital image data of NTSC transmitted from another image transmission device via the transmission control unit 111 and transmits digital image data of NTSC to another image transmission device via the transmission control unit 111. The NTSC I/O device 18 is connected to an NTSC camera 19, a loudspeaker 20, and a microphone 21.

The NTSC camera 19 picks up an NTSC image. The output NTSC image (analog image signal) from the NTSC camera 19 is applied to the NTSC I/O device 18. The NTSC I/O device 18 converts the input analog image signal into digital image data and outputs the data to the transmission control unit 111. The microphone 21 inputs voices. The NTSC I/O device 18 converts the input voice signal into digital voice data and outputs the digital voice data together with the digital image data to the transmission control unit 111.

The NTSC I/O device 18 also converts input digital image data from the transmission control unit 111 into an analog image signal and outputs the signal to the switching device 22.

The switching device 22 selectively outputs one of the input analog image signals from the HDTV I/O device 16 and the NTSC I/O device 18. The output analog image signal from the switching device 22 is supplied to a monitor display device 23. The monitor display device 23 displays an image on the screen in accordance with the input analog image signal.

As described above, this system processes two types of image data (HDTV and NTSC). Images of HDTV have a higher resolution than that of images of NTSC and hence are high-definition images. When an image signal is converted into digital data, an image of NTSC is converted into image data consisting of pixel data having, e.g., 320×250 pixels (80,000 pixels) per frame. An image of HDTV is converted into image data consisting of pixel data having, e.g., 1920× 1024 pixels (about 2,000,000 pixels). Since image data of HDTV has a larger number of pixels, the data amount is also larger and the transfer of the data takes a longer time.

The operation of the image transmission system with the above arrangement will be described below.

Assume that the image transmission devices 110, 120, and 130 are installed in remote-places and a multipoint conference is held by using this system.

Assume also that the image transmission device 120 transmits a Highvision image to the image transmission devices 110 and 130 in other places.

In the place where the image transmission device 120 is installed, an image (e.g., a slide) to be transmitted is registered in the system. That is, the internal HDTV camera 17 of the image transmission device 120 picks up the image to be transmitted. The image signal from the HDTV camera 17 is converted into digital image data by the HDTV I/O device 16 and stored in the storage device 15 by the CPU 12.

The digital image data thus formed is read out from the storage device 15 and transmitted from the transmission control unit 121 to the image transmission devices 110 and 130 through the network line 2.

The operation-of the image transmission device 110 which has received the transmitted digital image data will be described below (the operation of the image transmission device 130 is the same).

The digital image data is once stored in an internal memory of the CPU 12 via the transmission control unit 112. Thereafter, the data is transferred to the HDTV I/O device 16 and stored in the frame memory 24. The HDTV I/O device 16 reads out the digital image data stored in the frame memory 24, converts the readout data into analog image data, and outputs the converted data to the switching device 22. At this time, the CPU 12 switches the switching device 22 to select the output from the HDTV I/O device 16.

Consequently, the monitor display device 23 displays an image based on the digital image data stored in the frame memory 24 (i.e., the digital image data transmitted from the image transmission device 120).

The CPU 12 transfers the input digital image data to the HDTV I/O device 16 as described above and also stores the data in the storage device 15. The storage device 15 is a hard disk device or an optical disk device and is very stable compared to the frame memory. Also, each image data is assigned a name when stored. Generally, the frame memory 24 can store image data of only one frame or several frames. However, the storage device 15 has a large storage capacity and can store a large amount of image data. Therefore, the storage device 15 can sequentially store digital image data transmitted in succession. Since each image data is assigned a name when stored, data can be read out by designating their names.

The contents of the frame memory are sometimes erased by an erroneous operation. Also, when another image data is transmitted, previously stored image data is sometimes erased because the new image data is overwritten. Furthermore, transmitted image data is in some instances not stored in the frame memory 24 due to an erroneous operation or the like.

As described above, when the digital image data stored in the frame memory 24 is erased for some reason, the image of the data can no longer be displayed on the monitor display device 23.

If this is the case, the CPU 12 reads out the digital image data stored in the storage device 15 and retransmits the readout data to the HDTV I/O device. It is also possible to read out image data which the user wants to display again by designating the name (added when the data is stored) of the data in this manner the digital image data is again stored in the frame memory 24 and the image of the data is displayed on the monitor display device 23. That is, the data can be revived from the storage device 15.

In this image transmission system as described above, transmitted image data is stored in the frame memory and simultaneously stored in the storage device. Therefore, even if the data in the frame memory is erased, the display can be restored within a far shorter time than when the image data is retransmitted.

In the device of this embodiment as described above, transmitted image data is stored in the frame memory and simultaneously stored in the storage device. Therefore, even if the data in the frame memory is erased, a display of the image can be restored within a short time period without retransmitting the image data.

An image transmission system according to the second embodiment of the present invention will be described below. The system configuration and the arrangement of each image transmission device of this second embodiment are the same as those of the first embodiment described above with reference to FIGS. 2 and 1, respectively, so drawings and a description thereof will be omitted. Since the second embodiment has the same system and device arrangements as in the first embodiment, the embodiment will be described by using the same reference numerals as in FIGS. 1 and 2.

Figure 3:
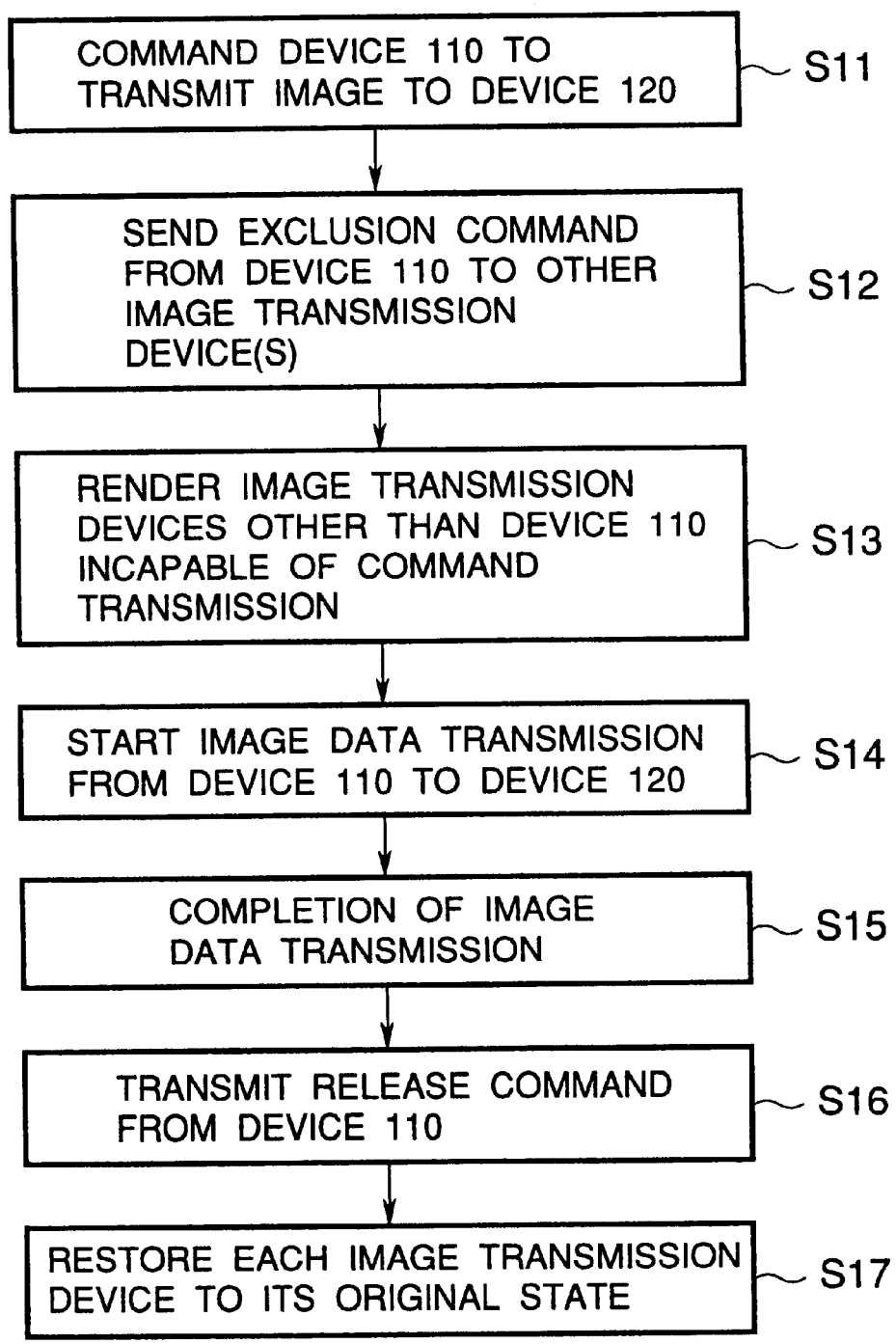
FIG. 3 is a flow chart for explaining the operation of an image transmission system according to the second embodiment of the present invention.

The operation of the system of the second embodiment will be described below by using a flow chart in FIG. 3.

Assume that an image transmission device 110 transmits an image to an image transmission device 120 via a network.

First, the image transmission device 110 is commanded to transmit an image to the image transmission device 120 (step S11). This is done by an operator operating the image transmission device 110 by using input devices such as a keyboard 14, a mouse 25, and a tablet 26. Before starting transmission of image data, the image transmission device 110 sends an exclusion command to the image transmission device 120 and other image transmission devices (step S12). When receiving the exclusion command, the other image transmission devices render themselves incapable of command transmission (step S13). That is, each image transmission device has a function of transmitting commands. However, when receiving the exclusion command, each image transmission device makes this command transmission function unusable for itself. In this case, transmission of data such as image data is, of course, also impossible.

Since the other image transmission devices including the image transmission device 120 are incapable of transmitting commands, only the image transmission device 110 can transmit commands or data onto the network. Thereafter, the image transmission device 110 starts transmitting image data (step S14). Since high-definition image data such as Highvision image data has a large data amount, the network is exclusively used to transmit this image data until the transmission of the image data is completed. When the image data transmission is completed (step S15), the image transmission device 110 transmits a release command for releasing the prohibition of transmission (step S16). Upon receiving the release command, each image transmission device restores itself to its original state of capable of transmission (step S17).

As described above, exclusive-control is performed in transmitting image data. Accordingly, while a certain image transmission device is transmitting a high-definition image such as a Highvision image, other image transmission devices do not transmit commands or image data.

If no exclusive control is performed, while one station is transmitting image data to another station, some other station may input a command or transmit another image data without knowing it. If this is the case, a signal other than image data or another image data is mixed in the image data transmitted first, resulting in disturbance of the image or superposition of a plurality of images on the receiving side. This system solves these problems.

Figure 6:
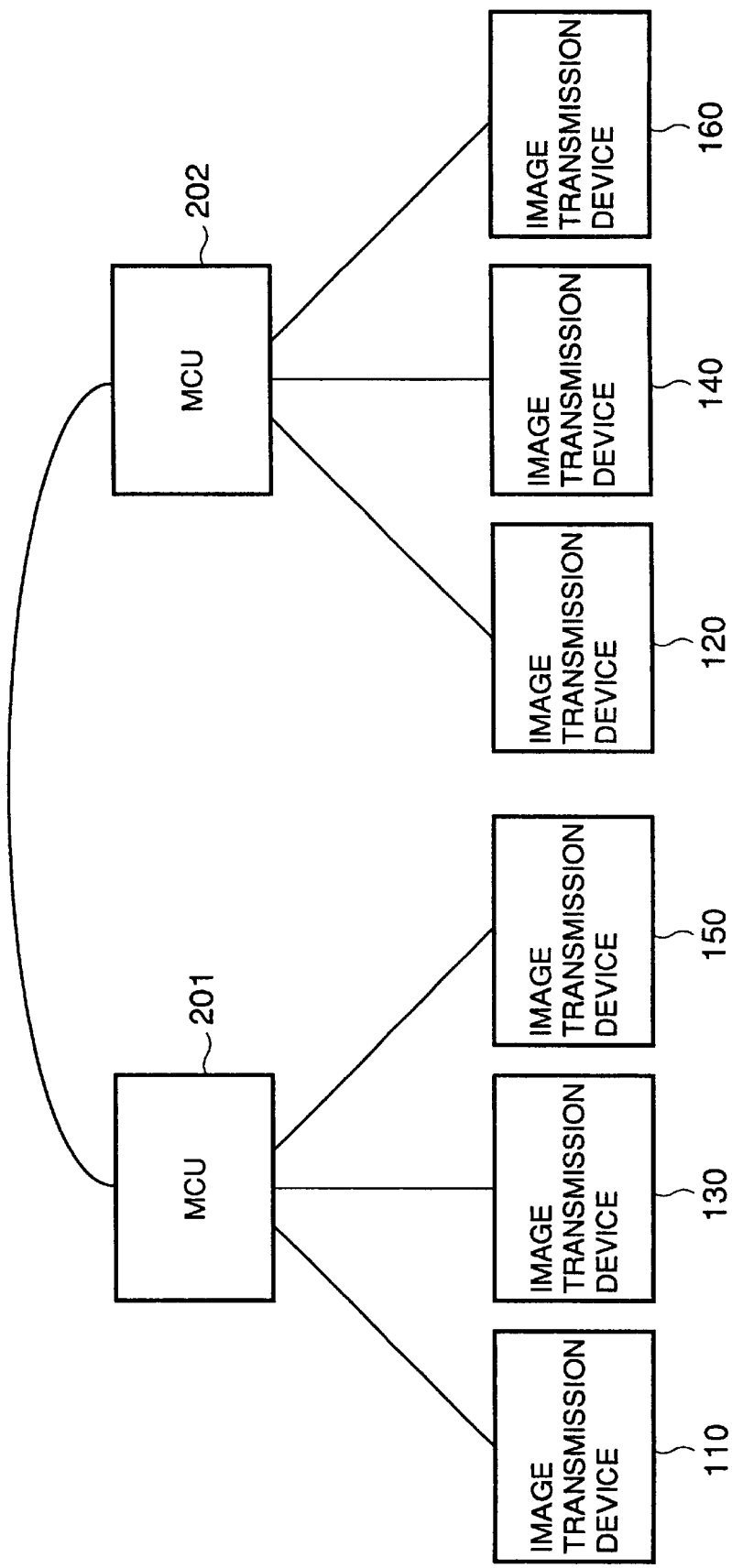
FIG. 6 is a view showing the arrangement of the image transmission systems according to the third and fourth embodiments of the present invention.

FIG. 6 is a view showing the arrangement of an image transmission system according to the third .embodiment of the present invention. This image transmission system includes a multipoint control unit (to be referred to as an MCU hereinafter). In the image transmission system shown in FIG. 6, an MCU is connected to a plurality of image transmission devices, and two such MCUs 201 and 202 are. connected to each other. That is, the MCU 201 is connected to image transmission devices 110, 130, and 150, and the MCU 202 is connected to image transmission devices 120, 140, and 160. The configuration of each image transmission device is the same as in FIG. 1 and the same reference numerals as in FIG. 1 will be used in the following description.

Figure 7:
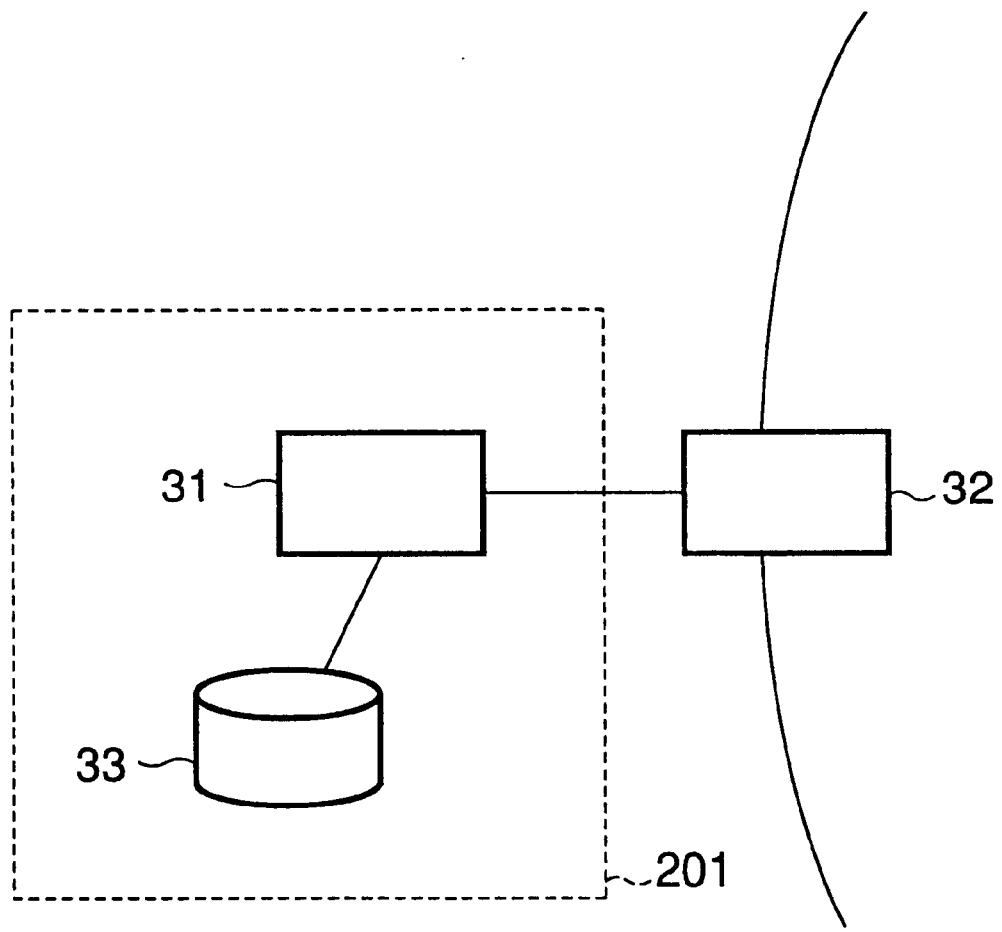
FIG. 7 is a view showing the arrangement of a multipoint control unit (MCU) according to the third and fourth embodiments of the present invention.

FIG. 7 is a view showing the arrangement of the MCU. Although FIG. 7 shows the arrangement of the MCU 201, the MCU 202 has the same arrangement. A CPU 31 is connected to a transmission control unit 32 for controlling transmission with respect to other devices. The CPU 31 receives commands and image data transmitted from an image transmission device or the other MCU via the transmission control unit 32. The input commands and image data can be stored in a storage device 33. The MCU 201 transmits commands and image data transmitted from any of the image transmission devices 110, 130, and 150 connected to the MCU 201 to image transmission devices other than the transmission source or to the other MCU (MCU 202). Also, the MCU 201 transmits commands and image data transmitted from the MCU 202 to the image transmission devices 110, 130, and 150 connected to the MCU 201.

The operation of the system of this embodiment will be described below with reference to a flow chart in FIG. 4. In the second embodiment, an exclusive control signal is directly transmitted from an image transmission device which intends to start image transmission to other image transmission devices, and each image transmission device which has received the signal controls itself. In the third embodiment, the multipoint control units (MCUs) 201 and 202 are given this function.

Assume that the image transmission device 110 transmits image data to the image transmission device 120. The image transmission device 110 is commanded to transmit image data to the image transmission device 120 (step S21). The image transmission device 110 sends an exclusion command to all MCUs (in this embodiment, the MCUs 201 and 202) (step S22). Upon receiving the exclusion command from the image transmission device 110, the MCU 201 is set to a state in which the MCU 201 ignores any command and image data from image transmission devices other than the image transmission device 110 (step S23). The exclusion command is transferred from the MCU 201 to the MCU 202. Similar to the MCU 201, the MCU 202 is set to a state in which the MCU 202 ignores any command and image data from image transmission devices other than the image transmission device 110. Ignoring any command and image data means that a command or image data is not executed even if it is received or a command or image data is not at all received. As a consequence, no new data is transmitted by a received command or received image data is not transmitted to other image transmission devices. Thereafter, the image transmission device 110 starts transmission of image data (step S24). When the image data transmission is completed (step S25), the image transmission device 110 sends a release command for releasing the state in which the MCU ignores any command and image data (step S26). All MCUs which have received the release command release the state in which they ignore any command and image data and become capable of reception (step S27).

The fourth embodiment will be described below with reference to a flow chart in FIG. 5.

The system configurations of this embodiment are the same as in the third embodiment shown in FIGS. 6 and 7.

Figure 4:
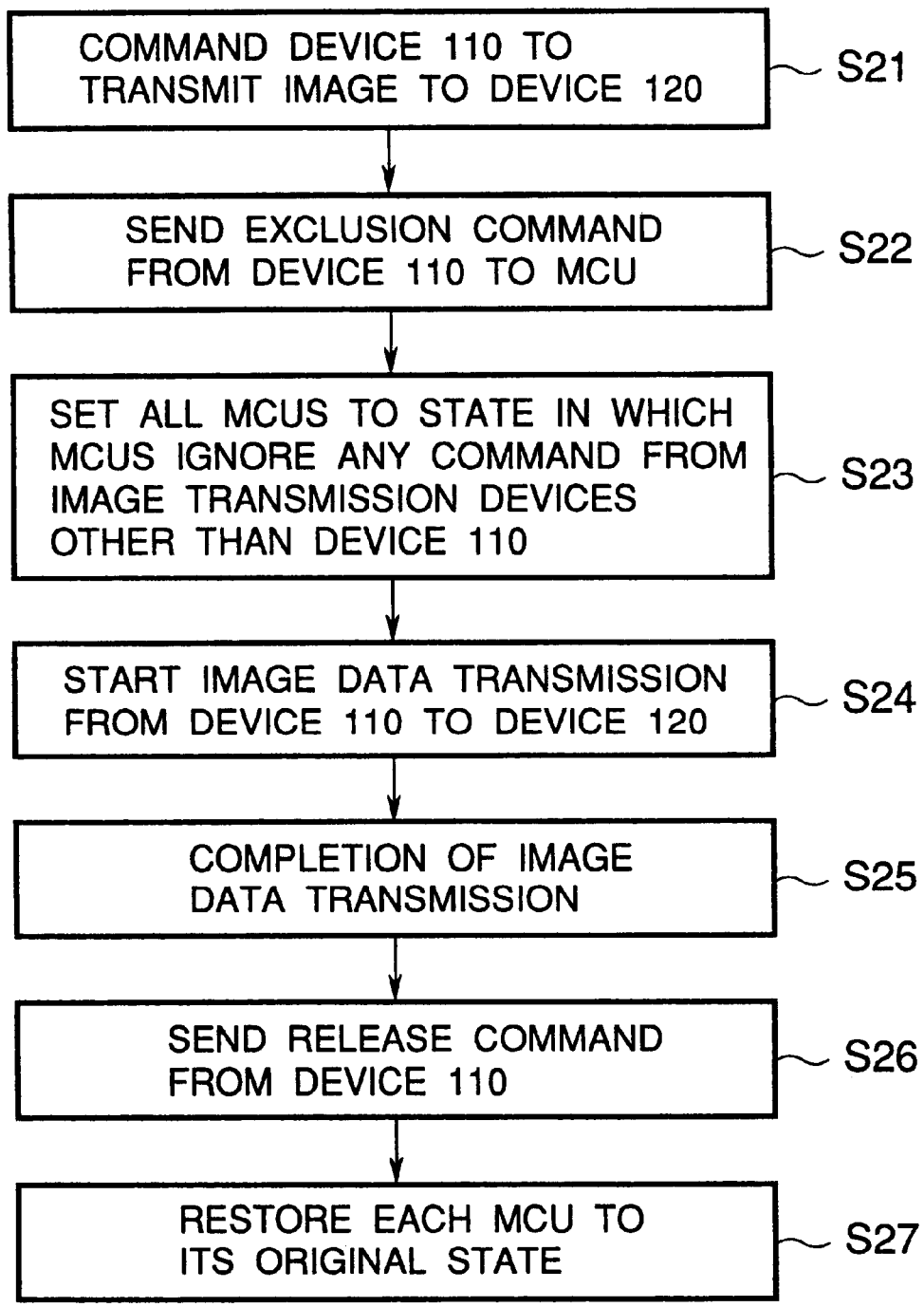
FIG. 4 is a flow chart for explaining the operation of an image transmission system according to the third embodiment of the present invention.
Figure 5:
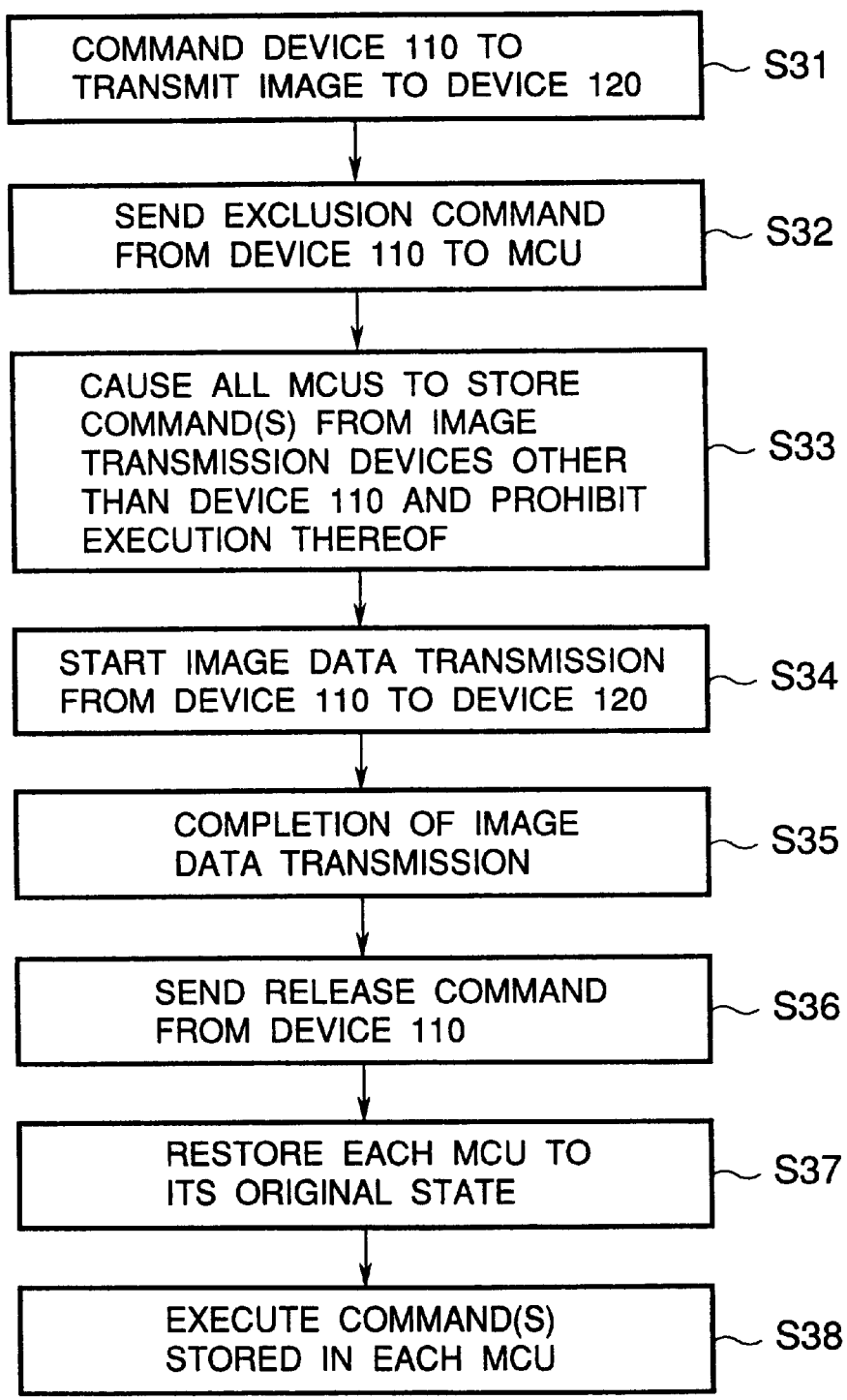
FIG. 5 is a flow chart for explaining the operation of an image transmission system according to the fourth embodiment of the present invention.

In FIG. 5, steps S31 and S32 ate the same as steps S21 and S22 in FIG. 4.

In the third embodiment, when receiving an exclusion command aft MCU is set to a state in which the MCU ignores any command and image data from other image transmission devices. In the fourth embodiment, upon receiving an exclusion command an MCU is set to an exclusive mode in which the MCU simply stores a received command or image data in a storage device 33 without executing or displaying the command or image data (step S33). Steps S34, S35, S36, and S37 are the same as steps S24, S25, S26, and S27 in FIG. 4. When the image data transmission is completed, the exclusive mode is released and the stored command is executed or the stored image data is processed (step S38).

As described above, while a certain image transmission device is transmitting image data, data transmitted from other devices is temporarily held by the MCU. This prevents other image data from mixing in the image data transmitted first. Furthermore, input commands and image data from image transmission devices other than an image transmission device which is currently transmitting image data are not ignored but temporarily stored and executed at a later time although there is a certain delay of time.

In each of the second, third, and fourth embodiments as described above, transmission of image data from an image transmission device can be completed within short time periods. Additionally, it is possible to prevent mixing of data in image data currently being transmitted. Also, data transmitted from image transmission devices other than a device which is currently transmitting image data is executed later without being ignored.

An image transmission system according to the fifth embodiment of the present invention will be described below. The system configuration and the arrangement of each image transmission device of this fifth embodiment are the same as those of the first embodiment described above with reference to FIGS. 2 and 1, respectively, so drawings and a description thereof will be omitted. The embodiment will be described by using the same reference numerals as in FIGS. 1 and 2.

The operation of the image transmission system of the fifth embodiment will be described below.

Assume that image transmission devices 110, 120, and 130 are installed in remote places and a multipoint conference is held by using this system. A host place is a site where the image transmission device 110 is installed, and places participating in the conference are sites where the image transmission devices 120 and 130 are installed. A presenter (usually a plurality of presenters exist) of the conference is in the place where the image transmission device 120 is installed (the place in which the image transmission device 120 is installed will be called a presenting place hereinafter).

The presenter registers images (e.g., slides) used in the presentation into the system by using the image transmission device 120 in the presenting place. That is, the images used in the presentation are picked up by an internal HDTV camera 17 of the image transmission device 120. The image signal from the HDTV camera 17 is converted into digital image data by an HDTV I/O device 16 and stored in a storage device 15. The stored image data is displayed on a display device 13 and manipulations of, e.g., changing the order of the registered images and erasing images are performed by using a keyboard 14 and a mouse.

The image data thus formed (i.e., materials used in the conference and usually consisting of a plurality of image data) are transmitted from a transmission control unit 121 to the image transmission device 110 in the host place through a network line 2. These image data can be simultaneously transmitted. If corrections are necessary after the simultaneous transmission,.it is possible to transmit only corrected data and replace portions to be corrected of the image data in the transmission destination with the corrected data.

In the image transmission device 110 in the host place, the materials used in the conference supplied via a transmission control unit 112 are stored in a storage device 15. The image data are sent from a plurality of presenters.

Subsequently, the image transmission device 110 in the host place transfers the image data as the materials used in the conference to, in this case, the image transmission device 130. The transferred data are stored in a storage device 15 of the image transmission device 130.

The operation of transferring the image data to the individual places as described above is performed before the conference begins. To begin the conference, predetermined setting is performed in an image transmission device in each place to allow communications on the network.

The presenter in the presenting place begins presentation. In the presenting place, the keyboard 14 and the mouse are manipulated to select images to be displayed in accordance with instructions from the presenter. The display order can be a preset order and can also be changed. In the presenting place, a CPU 12 reads out the selected image data from the storage device 15. The CPU 12 switches a switching device 22 to select the output from the HDTV I/O device 16. The readout image data is supplied to a monitor display device 23 via the HDTV I/O device 16 and the switching device 22. The selected image is displayed as a Highvision image on the monitor display device 23.

To display the selected image in other places, the CPU 12 outputs an indication signal for displaying the image to transmission control units 112 and 132 in other places via a transmission control unit 122.

The indication signal sent to the transmission control units 112 and 132 is applied to the image transmission devices in the respective places. Upon receiving the indication signal, a CPU 12 reads out image data indicated by the indication signal from a storage device. The readout image data is supplied to a monitor display device 23 via an HDTV I/O device 16 and a switching device 22. The image indicated by the indication signal is displayed as a Highvision image on the monitor display device 23. At this time, the CPU 12 has switched, of course, the switching device 22 to select the output from the HDTV I/O device 16.

As described above, when images to be displayed are switched in the presenting place, the display is switched to the same image in other places. The data amount of the indication signal is far smaller than the amount of image data of one frame of Highvision. Therefore, the time required to send the indication signal is much shorter than the time required to send the image data. Accordingly, when display images are switched in the presenting place, display images are switched in almost real time in other places.

As described above, the presenter performs presentation while switching display images. The voice of the presenter is picked up by a microphone 21 in the presenting place and transmitted as a voice signal to other places. The voice signal is reproduced in each place and output from a loudspeaker 20. The face of the presenter and the scene of the presenting location are picked up by an NTSC camera 19 in the presenting place and transmitted as image data to other places. This image data is converted into an analog image signal by an NTSC I/O device 18 in each place and output to the switching device 22. The images can be displayed on the monitor display device 23 by switching output signals from the switching device 22.

Also, the presenter can electronically write a pointer (an arrow indicating a desired position in an image), graphic forms such as straight lines, curved lines, and circles, and characters in the image displayed on the monitor display device 23 by using a mouse or a tablet. On the basis of an input signal from the mouse or the tablet, the CPU 12 generates drawing data. The drawing data is converted by the HDTV I/O device 16 and displayed on the monitor display device 23.

The drawing data generated in the presenting place is transmitted to other places via the transmission control unit 112. Each of the other places receives the drawing data via the transmission control unit. The input drawing data is supplied to the monitor display device 23 via the CPU 12, the HDTV I/O device 16, and the switching device 22 and displayed.

In this manner the graphic forms and characters are electronically drawn by the presenter in the presenting place can be displayed on the monitor display devices 23 in all places. These graphic forms and characters can also be superposed on the image already displayed on the monitor display. In this way the graphic forms and characters can be used to indicate a certain portion in the displayed image.

During the conference, questions can be asked and answered from places other than the presenting place. To ask or answer a question, it is only necessary to speak to the microphone 21 in the place. The input voice from the microphone 21 is output from the loudspeakers 20 in other places. This operation is the same as the operation when the voice is transmitted from the presenting place to other places.

In this embodiment, a so-called television telephone system is formed by the microphone 21, the loudspeaker 20, the NTSC camera 19, the monitor display device 23, and the NTSC I/O device 18.

In asking or answering a question, the questioner or answerer can indicate a position in the displayed image by displaying a pointer on the monitor display device 23 and can display graphic forms or characters other than the image on the display device 23. This operation is accomplished by using a mouse or a tablet. These graphic forms or characters drawn by the questioner or answerer can be transmitted as drawing data to other places and displayed on the monitor display device 23 in each place. The operation is the same as when graphic patterns or characters drawn in the presenting place are transmitted to other places.

In asking or answering a question during the conference, the questioner or answerer sometimes wishes to give an explanation by displaying an image other than the images transmitted to the individual places before the conference began.

If this is the case, the material to be displayed is picked up by the NTSC camera 19. An image signal of the picked-up image is applied to the NTSC I/O device 18. The NTSC I/O device 18 converts the input image signal into digital image data. This image data is transmitted to the image transmission devices in other places via the transmission control-unit. The transmission time is short because image data of NTSC has a small number of pixels and a small data amount. After outputting the image data, the NTSC I/O device 18 outputs an indication signal for displaying the image. This indication signal is also sent to the image transmission devices in other places via the transmission control unit.

Thereafter, the material picked up by the NTSC camera 19 as described above is again picked up by this time the HDTV camera 17. An image signal of the picked-up image is applied to the HDTV I/O device 16 where the signal is converted into digital image data. This image data is transmitted to the image transmission devices in other places via the CPU 12 and the transmission control unit. The transmission requires a long time because image data of HDTV has a large number of pixels and a large data amount. After outputting the image data, the CPU 12 outputs an indication signal for displaying the image. This indication signal is also[]sent to the image transmission devices in other places via the transmission control unit.

Although an image of a material can be picked up by using two cameras as described above, the image pickup need not be performed twice when the following method is used. That is, a down converter is connected to the HDTV camera 17. This down converter converts an output signal (a television signal of HDTV) from the HDTV camera into a television signal of NTSC and outputs the converted signal to the NTSC I/O device 18. At the same time, the output signal from the HDTV camera is applied to the HDTV I/O device 16. The subsequent operation is the same as above.

Other places sequentially receive the NTSC image data and the HDTV image data. The NTSC image data is applied from the transmission control unit 121 (in the case of the image transmission device 120) to the NTSC I/O device 18. The NTSC I/O device 18 converts the input image data into an analog image signal and outputs the signal to the switching device 22. An indication signal for displaying an NTSC image is supplied from the transmission control unit 122 (in the case of the image transmission device 120) to the CPU 12. Upon receiving the indication signal, the CPU switches the switching device 22 to select the output from the NTSC I/O device 18. As a result, the image picked by the NTSC camera 19 in another place is displayed on the monitor display device 23.

It does not take a long time to display the image picked up by the NTSC camera in another place on the monitor display device 23. The HDTV image data is transmitted after the indication signal for displaying the NTSC image. Since the amount of the HDTV data is large, the data does not completely arrive immediately. Meanwhile, participants can see the outline of the image as the material by displaying the NTSC image on the monitor display device 23.

The HDTV image data is input from the transmission control unit 122 (in the case of the image transmission device 120) to the CPU 12. When the data is completely input, the CPU 12 outputs the data to the HDTV I/O device 16. The HDTV I/O device 16 converts the input image data into an analog image signal and outputs the signal to the switching device 22. An indication signal for displaying the HDTV image is applied from the transmission control unit 122 (in the case of the image transmission device 120) to the CPU 12. When receiving the indication signal, the CPU 12 switches the switching device 22 to select the output from the HDTV I/O device 16. Consequently, the display on the monitor display device 23 is switched from the NTSC image to the HDTV image.

To conclude the conference, the host place sends a signal indicating the conclusion of the conference to other places. The image transmission device in each place releases the setting by which communications are possible on the network.

The above indication signal (,for indicating an image to be displayed in remote places) will be described below. A method of selecting image data to be displayed by using an indication signal expressed by two types of names will be described.

FIG. 8 is a view showing the way image data is represented by two types of names in the form of a table. These two types of names are names added to specify image data; the first name is a cassette name and the second name is a file name. Each image data is expressed by "cassette name+file name". Image data stored in the storage device 15 of each image transmission device can also be represented in this way.

A plurality of data having the same cassette name exist, and these data can also be collectively represented by using the cassette name.

FIG. 8 shows image data stored in the storage device in a place A. Image data having cassette names DA, DB, DC, DE, and DF are present. As image data having the cassette name DE, five file names E01, E02, E03, E04, and E05 exist.

In this embodiment, all file names (A01, . . . , A05, . . . , E05) shown in FIG. 8 are different. However, the same file name can also be repetitively used as long as the cassette names are different. That is, it is only necessary to be able to uniquely specify image data by "cassette name+file name".

FIG. 9 shows image data stored in the storage device 15 in a place B. In the place B, images are present in order of cassette names DB, DA, DE, DF, and DC. As image data having the cassette name DE, five file names E01, E02, E03, E04, and E05 exist as in the place A.

Assume that the place A is the sending side of the indication signal and the place B is the receiving side. Since the indication signal contains "cassette name+file name", the image data can be specified and displayed in the place B. In this case, the image data to be displayed can be specified by once sending the indication signal containing "cassette name+file name". FIGS. 8 and 9 illustrate a case where "DE+E03" is specified.

As described above, when a certain image is ocessed in the place A, image data of the processed image can be specified in the place B by sending the indication signal. Consequently, the same image as in the place A can be displayed in the place B,.

As the indication signal, it is also possible to perform designation twice, i.e., first designate the cassette name and then designate the file name. If this is the case, two indication signals are sent to specify one image data. That is, an indication signal containing the cassette name is transmitted for the first time, and an indication signal containing the file name is transmitted for the second time. However, to indicate a display of image data having the same cassette name as image data for which two indication signals are already sent, it is unnecessary to send an indication signal containing the same cassette name again; that is, it is only necessary to send an indication signal containing the file name.

In the above embodiment, it is assumed that both the cassette name and the file name indicated by the indication signal exist. However, no image is displayed if indicated "cassette name+file name" does not exist.

As described above, each image data is identified by two types of names and stored in a storage device by using these two types of names. This facilitates processing image data. Image data can be processed as individual files, and a plurality of files can be processed in units of cassettes.

In the system of the fifth embodiment as has been described above, high-definition images can be simultaneously seen in different places. Also, processing of image data can be facilitated by identifying image data by two types of names and storing the image data in a storage device by using these two types of names.

What is claimed is:

1. An image transmission system comprising:
   a plurality of image transmission devices capable of transmitting and receiving image data; and
   a control unit connected to said image transmission devices to control data transmission between said image transmission devices, said control unit including exclusive control means which, while a certain image transmission device is transmitting image data to another image transmission device, stores a command or image data received from other image transmission devices and temporarily stops execution of the command or retransmission of the image data.

2. A system according to claim 1, wherein when the transmission of image data from a certain image transmission device to another image transmission device is completed, said exclusive control means stops storing a command or image data received from other image transmission devices and transmits the stored command or image data.

3. A system according to claim 1, wherein when the transmission of image data from a-certain image transmission device to another image transmission device is completed, said exclusive control means. executes the stored command or transmits the stored image data.

* * * * *